(12) United States Patent
van Dijk et al.

(10) Patent No.: US 12,261,715 B2
(45) Date of Patent: Mar. 25, 2025

(54) CAN MODULE, CAN TRANSCEIVER, CAN SYSTEM AND METHOD FOR CAN MODULE

(71) Applicant: NXP B.V., Eindhoven (NL)

(72) Inventors: Lucas Pieter Lodewijk van Dijk, Kranenburg (DE); Clemens Gerhardus Johannes de Haas, Ewijk (NL); Gerald Kwakernaat, Malden (NL)

(73) Assignee: NXP B.V., Eindhoven (NL)

( * ) Notice: Subject to any disclaimer, the term of this patent is extended or adjusted under 35 U.S.C. 154(b) by 78 days.

(21) Appl. No.: 18/305,849

(22) Filed: Apr. 24, 2023

(65) Prior Publication Data

US 2023/0353417 A1 Nov. 2, 2023

(30) Foreign Application Priority Data

Apr. 29, 2022 (EP) .................................... 22170926

(51) Int. Cl.
H04L 12/40 (2006.01)

(52) U.S. Cl.
CPC ............... *H04L 12/40006* (2013.01); *H04L 2012/40215* (2013.01)

(58) Field of Classification Search
CPC ............... H04L 12/40006; H04L 2012/40215
See application file for complete search history.

(56) References Cited

U.S. PATENT DOCUMENTS

| | | | |
|---|---|---|---|
| 2012/0155285 A1 | 6/2012 | Smart et al. | |
| 2016/0286010 A1 | 9/2016 | Lennartsson | |
| 2016/0330044 A1* | 11/2016 | Andrews | H04L 5/0055 |
| 2019/0129778 A1* | 5/2019 | Olson | G06F 13/4295 |
| 2019/0310317 A1* | 10/2019 | Elend | H04L 43/50 |
| 2020/0287755 A1* | 9/2020 | Porto | H04L 43/50 |
| 2022/0239576 A1 | 7/2022 | Mutter et al. | |

OTHER PUBLICATIONS

Texas Instruments; "SN65VD33, SN65HVD234, SN65HVD235—SN65HVD23x 3.3-V CAN Bus Transceivers"; 39 pages (Nov. 2002—Revised Nov. 2018).

* cited by examiner

*Primary Examiner* — Eric T Oberly (57) ABSTRACT

The present invention relates to a CAN module configured to be arranged between a CAN controller and a CAN transceiver. The CAN module received a TXD input signal from the CAN controller and is configured to transmit an TXD output signal to the CAN transceiver, wherein the TXD output signal is adapted by the CAN module to also comprising a test impulse. When monitoring the CAN BUS, the CAN transceiver will feed back an RDX signal to the CAN module and the CAN controller. The CAN module is configured to detect an error on the CAN transceiver or the CAN BUS depending on the transmitted test impulse and the test impulse received via the RDX signal. The present inventio also relates to a system comprising the CAN module and a method for the CAN module.

13 Claims, 8 Drawing Sheets

Fig. 9

CAN MODULE, CAN TRANSCEIVER, CAN SYSTEM AND METHOD FOR CAN MODULE

CROSS-REFERENCE TO RELATED APPLICATIONS

This application claims the priority under 35 U.S.C. § 119 of European patent application no. 22170926.4, filed on 29 Apr. 2022 the contents of which are incorporated by reference herein.

TECHNICAL FIELD

The present disclosure relates to a Controller Area Network (CAN) module, a CAN transceiver, a CAN system and a method for the CAN module

BACKGROUND

CAN bus is a message-based communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more.

The data link layer of the CAN protocol is standardized as International Standards Organization (ISO) 11898-1. The standardized CAN data link layer protocol is in the process of being extended to provide higher data rates. The extended protocol, referred to as CAN Flexible Data-Rate or "CAN FD," has become part of the existing ISO 11898-1 standard. A further extension, referred to as CAN XL, with a new level scheme allowing even higher data rates is in the definition phase discussed under CiA610 (CAN in Automation), is discussed in draft specification CiA610-1, and is moving towards standardization in the form of either a further update of the existing ISO11898 standards or a new standard.

SUMMARY

Aspects of the disclosure are defined in the accompanying claims.

In accordance with a first aspect of the present disclosure, a Controller Area Network, CAN, module is provided. The CAN module comprising a transmit data, TXD, input interface for receiving a TXD input signal from a CAN controller, the input signal representing at least one TXD frame of bits, a TXD output interface for transmitting a TXD output signal to a CAN transceiver, a receive data, RXD, input interface for receiving a RXD input signal from the CAN transceiver, the RXD input signal representing at least one RXD frame of bits, and a processing logic configured to detect an end of frame sequence of a first TXD frame of the at least one TXD frame, wherein the processing logic is configured to generate the TXD output signal based on the TXD input signal, such that the TXD output signal represents the at least one TXD frame of the input signal and in addition a test pulse in a first time interval following the first TXD frame, wherein the processing logic is configured to detect whether the RXD input signal either represents the test pulse or does not represent the test pulse, and wherein the processing logic is configured to determine an error of the CAN transceiver or a CAN BUS network connected to the CAN transceiver in response to a positive detection that the test pulse is not represented by the RXD input signal.

In one or more embodiments of the CAN module, the TXD input signal represents a second TXD frame following the first frame at a time offset, the time offset between the first frame and the second frame being at least the first time interval.

In one or more embodiments of the CAN module, the processing logic is configured to detect a first RXD frame corresponding to the first TXD frame, wherein the processing logic is configured to detect the test pulse only in a second time interval following the first RXD frame, the second time interval corresponding to the first time interval.

In one or more embodiments of the CAN module, the processing logic is configured to detect whether the RXD input signal represents a start of frame, SOF, bit of another second RXD frame in a third time interval following the first RXD frame, the processing logic is configured to configured to generate the TXD output signal representing the at least one TXD frame and the test pulse only if processing logic does not detect the SOF of the second RXD frame in the third time interval.

In one or more embodiments of the CAN module, the third time interval is longer than the second time interval.

In one or more embodiments of the CAN module, the processing logic is configured to forward the TXD input signal as the TXD output signal, if the processing logic detects the SOF of the second RXD frame in the third time interval.

In one or more embodiments of the CAN module, the processing logic comprises a pulse generator to generate the test pulse.

In one or more embodiments of the CAN module, a test period of the test pulse is between 50 ns and 950 ns, preferably between 90 ns and 600 ns In one or more embodiments of the CAN module, the processing logic is configured to detect the duration of the test pulse represented by the RXD input signal, and wherein the processing logic is configured to determine the error of the transceiver or a CAN BUS network connected to the transceiver also or only if a time difference between the period of the test pulse represented by the TXD output signal and the duration of the test pulse represented by the RXD input signal is more than a predetermined tolerance time In one or more embodiments of the CAN module, the CAN module comprising a communication interface, wherein processing logic is configured to generate an error signal in response to a positive determination of the error, the error signal representing the error, and wherein the processing logic is configured to control the communication interface to transmit the error signal.

In one or more embodiments of the CAN module, the communication interface is configured to receive an instruction signal representing the instruction to initiate the generation of the TXD output signal representing the test pulse.

In accordance with a second aspect of the present disclosure, a CAN transceiver is provided. The CAN transceiver comprising a CAN network interface, a RXD output interface, a TXD input interface, a transmitter, a receiver, and a CAN module as an integral part of the CAN transceiver. The CAN module may be formed by a CAN module according to the first aspect and/or an embodiment thereof. The TXD input interface of the CAN module may form the TXD input interface of the CAN transceiver, wherein the transmitter may be coupled between the TXD output interface of the CAN module and the CAN network interface, and wherein the receiver may be coupled between the CAN network interface and both the RXD output interface of the transceiver and the RXD input interface of the CAN module.

In accordance with a third aspect of the present disclosure, a CAN system is provided. The CAN system of the third aspect comprising: a CAN controller and a CAN transceiver of the second aspect, wherein the CAN controller comprising a TXD output interface and in RXD input interface, wherein the TXD output interface of the CAN controller being coupled to the TXD input interface of the CAN transceiver, and wherein the RXD input interface of the CAN controller being coupled to the RXD output interface of the CAN transceiver.

In accordance with a fourth aspect of the present disclosure, another CAN system is provided. The CAN system of the fourth aspect comprising: a CAN module according to the first aspect or an embodiment thereof, and a CAN transceiver, wherein the CAN controller comprising a TXD output interface and an RXD input interface, wherein the TXD output interface of the CAN controller being coupled to the TXD input interface of the CAN module, wherein the RXD input interface of the CAN controller being coupled to a RXD output interface of the CAN transceiver, wherein the CAN transceiver comprising a CAN network interface, a TXD input interface, the RXD output interface, a transmitter, and a receiver, wherein the TXD input interface of the CAN transceiver being coupled to the TXD output interface of the CAN module, wherein the transmitter is coupled between the TXD input interface of the CAN transceiver and the CAN network interface, wherein the receiver is coupled between the CAN network interface and the RXD output interface of the transceiver.

In accordance with a fifth aspect of the present disclosure, a method for a Controller Area Network, CAN, module is provided, wherein the CAN module comprising a transmit data, TXD, input interface, a TXD output interface, a receive data, RXD, input interface, and a processing logic, and wherein the method comprising the following steps:
  a) receiving at the TXD input interface of the CAN module a TXD input signal from a CAN controller, the input signal representing at least one TXD frame of bits,
  b) the processing logic detecting an end of frame sequence of a first TXD frame of the at least one TXD frame,
  c) the processing logic generating an TXD output signal based on the TXD input signal, such that the TXD output signal represents the at least one TXD frame of the input signal and in addition a test pulse in a first time interval following the first TXD frame,
  d) transmitting at the TXD output interface the TXD output signal to a CAN transceiver,
  e) receiving in response to step d) at the RXD input interface a RXD input signal from the CAN transceiver, the RXD input signal representing at least one RXD frame of bits,
  f) the processing logic detecting whether the RXD input signal either represents the test pulse or does not represent the test pulse, and
  g) the processing logic determining an error of the CAN transceiver, or a CAN BUS network connected to the CAN transceiver in response to a positive detection in step f) that the test pulse is not represented by the RXD input signal.

In accordance with a sixth aspect of the present disclosure, a computer program is provided, comprising executable instructions which, when executed by a processing unit, cause the processing unit being configured to carry out the method of the fifth aspect and/or one or more embodiments thereof.

DESCRIPTION OF DRAWINGS

Embodiments of the present disclosure will be described in more detail with reference to the appended drawings, in which.

DESCRIPTION OF EMBODIMENTS

As indicated in the background section of the present disclosure, a CAN bus is a message-based communications bus protocol that is often used within automobiles. For example, a CAN bus protocol may enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more.

Figure 1:
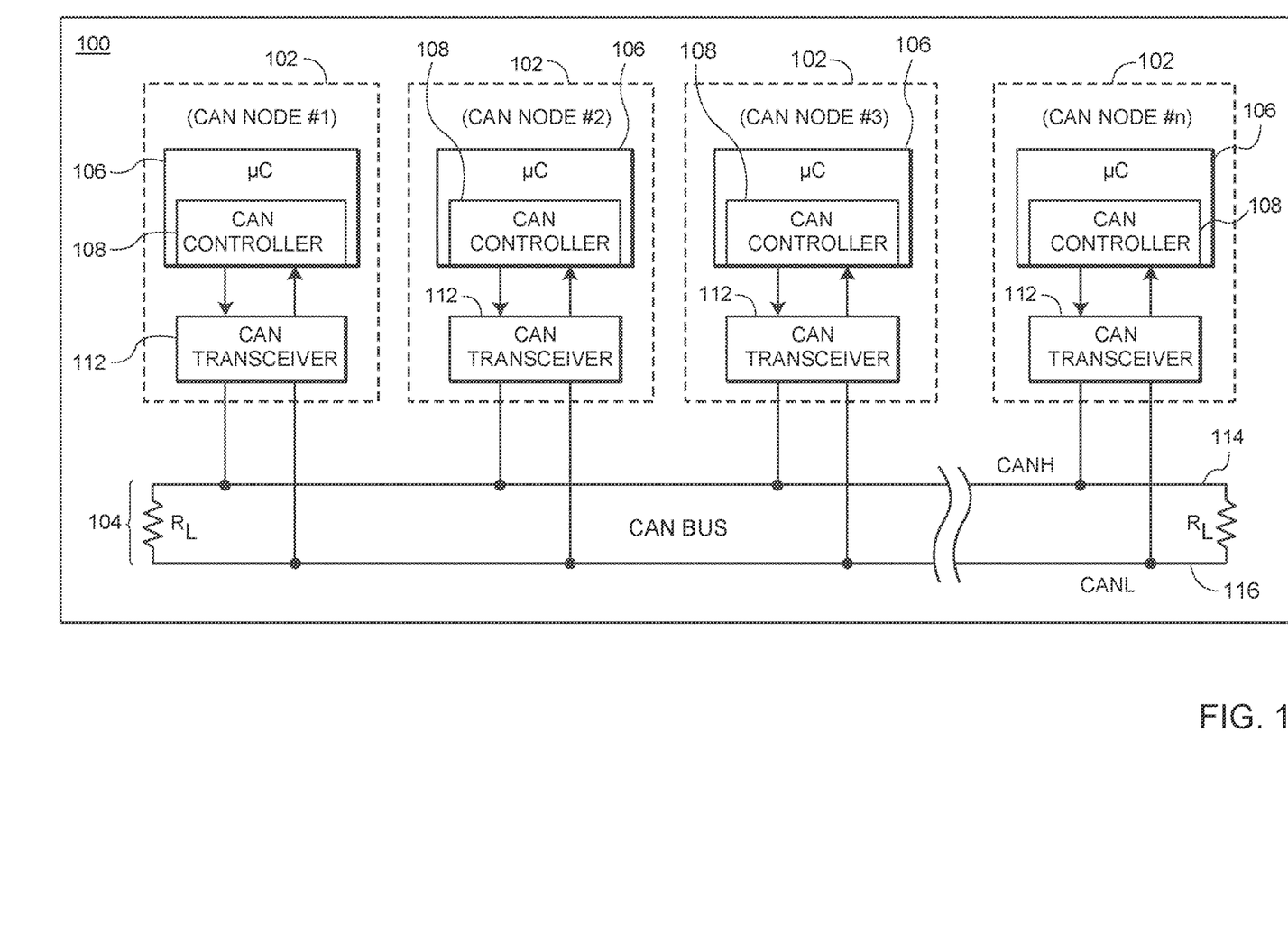
FIG. 1 shows a block diagram of a CAN network.

FIG. 1 depicts a CAN network 100 that includes multiple CAN nodes 102, also referred to as "ECUs," each connected to a CAN bus 104. In the embodiment of FIG. 1, each CAN node 102 includes a microcontroller 106 having an embedded CAN controller 108 and a CAN transceiver 112. The CAN controller 108 may be referred to as a controller or a CAN protocol controller. The CAN transceiver 112 may be referred to as a transceiver.

The microcontrollers 106 are typically connected to at least one device (not shown) such as a sensor, an actuator, or some other control device and are programmed to determine the meaning of received messages and to generate appropriate outgoing messages. The microcontrollers 106, which may also be referred to as host processors, hosts or digital signal processors (DSPs), are known in the field. In an embodiment, the host supports application software that interacts with the CAN controller.

The CAN bus 104 carries analog differential signals and includes a first CAN signal line 114, which is also referred to as the CAN high (CANH) bus line 114, and a second CAN signal line 116, which is also referred to as the CAN low (CANL) bus line 116. The CAN bus is known in the field.

Figure 2:
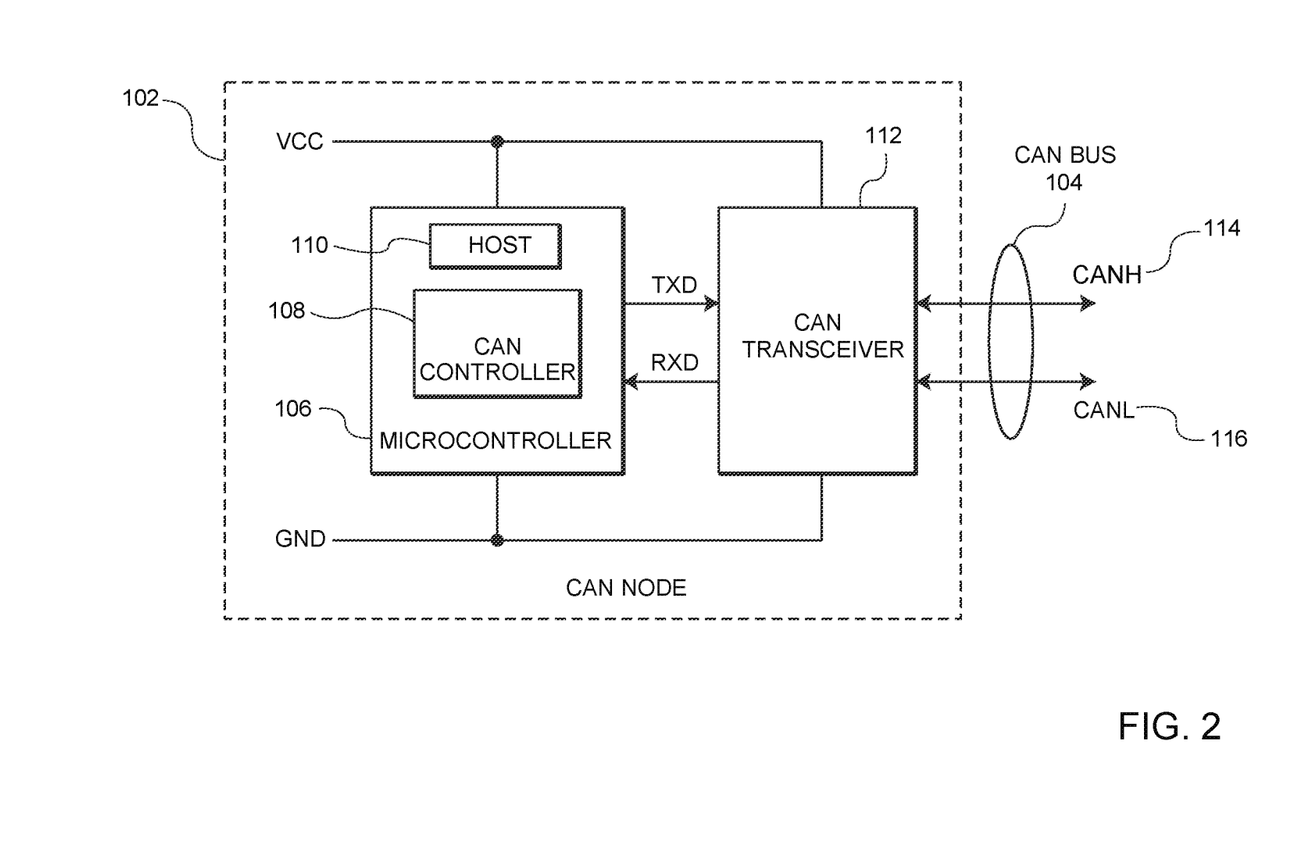
FIG. 2 shows simplified block diagram of CAN node.

FIG. 2 depicts an expanded view of a CAN node 102 from FIG. 1. In the expanded view of FIG. 2, the microcontroller 106 includes a host 110, which may be, for example, a software application that is stored in a memory of the microcontroller 106 and executed by processing circuits of the microcontroller 106. The microcontroller 106 and the CAN transceiver 112 of the CAN node 102 are connected between a first supply voltage, VCC, and ground, GND. For the purpose of the voltage supply, the CAN transceiver 112 may comprise a first voltage supply node, that can be connected to ground, and a second voltage supply node, that can be connected to the first supply voltage. The analogous nodes may be provided by the microcontroller 106 or may be even combined with the respective nodes of the microcontroller 106. As illustrated in FIG. 2, data communicated from CAN controller 108 being implemented by the microcontroller 106 to the CAN transceiver 112 is identified as transmit data (TXD) and data communicated from the CAN transceiver 112 to the CAN controller 108 being implemented by the microcontroller 106 is referred to as receive data (RXD).

Throughout the description, TXD is carried on a TXD path and RXD is carried on an RXD path. Data is communicated to and from the CAN bus 104 via the CANH and CANL bus lines 114 and 116, respectively.

The CAN controller 108 is preferably embedded within the microcontroller 106 but may also be implemented external to the microcontroller 106 (e.g., a separate IC device). The data link layer operations between the CAN controller 108 and the CAN transceiver 112 is known in the field.

For example, in receive operations, the CAN controller 108 receives from the transceiver 112 serial bits in a bit stream, referred to as a RXD stream, via the RXD path. The CAN controller 108 can receive the bits of a frame and is preferably configured to store the received bits of the frame. The bits of the frame represent an entire message to be communicated from the transceiver 112 to the CAN controller 108 or at least a part of the message. The CAN controller 108 is preferably configured to decode the CAN message according to the standardized frame format of the CAN protocol.

In transmit operations, the CAN controller 108 receives a message from the microcontroller 106 and transmits the message as serial bits in a bit stream, referred to as a TXD stream, via the TXD path in a CAN frame format to the CAN transceiver 112, The bits of the frame may represent the entire message to be communicated or at least a part of the message.

The CAN transceiver 112 is usually located between the CAN controller 108 being implemented by the microcontrollers 106 and the CAN bus 104. The CAN transceiver 112 is configured to implement physical layer operations as known in the field.

For example, in receive operations, a CAN transceiver 112 converts analog differential signals from the CAN bus 104 to the RXD stream of serial bits that the CAN controller 108 can interpret. The CAN transceiver 112 may also protects the CAN controller 108 from extreme electrical conditions on the CAN bus 104, e.g., electrical surges.

In transmit operations, the CAN transceiver 112 converts serial bits of the TXD stream received via the TXD path from the CAN controller 108 into analog differential signals that are sent on the CAN bus 104.

As noted above, the CAN controller 108 can be configured to support the normal mode or the flexible data rate mode. As used herein, "CAN normal mode" (also referred to as "CLASSICAL CAN mode") as well as "CAN FD mode" refer to frames that are formatted according to the ISO 11898-1 standard.

Figure 3:
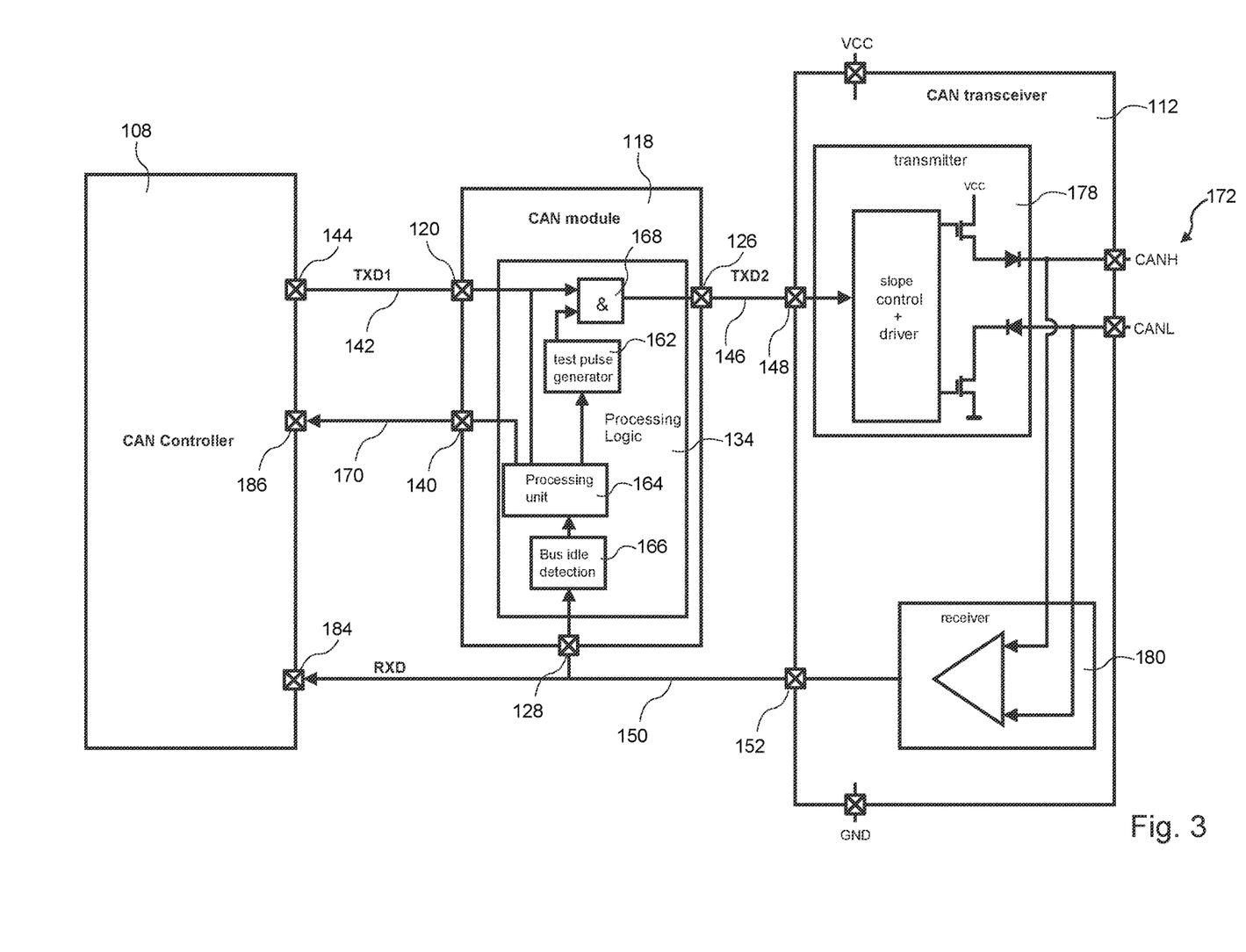
FIG. 3 shows a simplified block diagram including a CAN controller, a CAN module and a CAN transceiver.

FIG. 3 schematically illustrates one embodiment of a CAN module 118 of the present disclosure. In the embodiment shown in FIG. 3, the CAN module 118 is coupled between a CAN controller 108 and a CAN transceiver 112. However, connections of the CAN module 118 to the CAN controller 108 or to the CAN transceiver 112 are not mandatory. The following explanations may therefore refer to the CAN module 118 as such or to a CAN module 118 coupled to the CAN controller 108 and/or the CAN transceiver 112.

The CAN module 118 includes a TXD input interface 120. The TXD input interface 120 of the CAN module 118 may be coupled to a TXD output interface 144 of the CAN controller 108 via a signal connection 142. The TXD input interface 120 of the CAN module 118 is therefore configured to receive a TXD input signal from the CAN controller 108. The TXD input signal represents at least one TXD frame 122, and each TXD frame 122, 124 may comprise a plurality of bits.

The CAN module 118 further comprises a TXD output interface 126. The TXD output interface 126 of the CAN module 118 may be coupled to a TXD input interface 148 of the CAN transceiver 112 via another signal connection 146. The TXD output interface 126 of the CAN module 118 is therefore configured to transmit a TXD output signal to the CAN transceiver 112.

The CAN module. 118 further comprises an RXD input interface 128. The RXD input interface 128 of the CAN module 118 may be coupled to an RXD output interface 152 of the CAN transceiver 112 via another signal connection 150. The RXD input interface of the CAN module 118 is therefore configured to receive an RXD input signal of the CAN transceiver 112. The RXD input signal represents at least one RXD frame 130, and each RXD frame 130, 132 may comprise a plurality of bits.

The CAN module 118 also includes processing logic 134. The processing logic 134 may include a processing unit 164 configured to process bits and/or bit frames. A bit frame may also be referred to as a frame. The processing logic 134 may also include programmable logic circuits.

The CAN Module 118 may be configured to support CAN Normal Mode or CAN Flexible Data Rate Mode (CAN-FD Mode). CAN Normal Mode (also referred to as "Classic CAN Mode") refers to frames formatted according to the ISO 11898-1 standard, and "CAN-FD Mode" refers to frames formatted according to the International Standard ISO 11898-1 standard or its equivalent.

Figure 4:
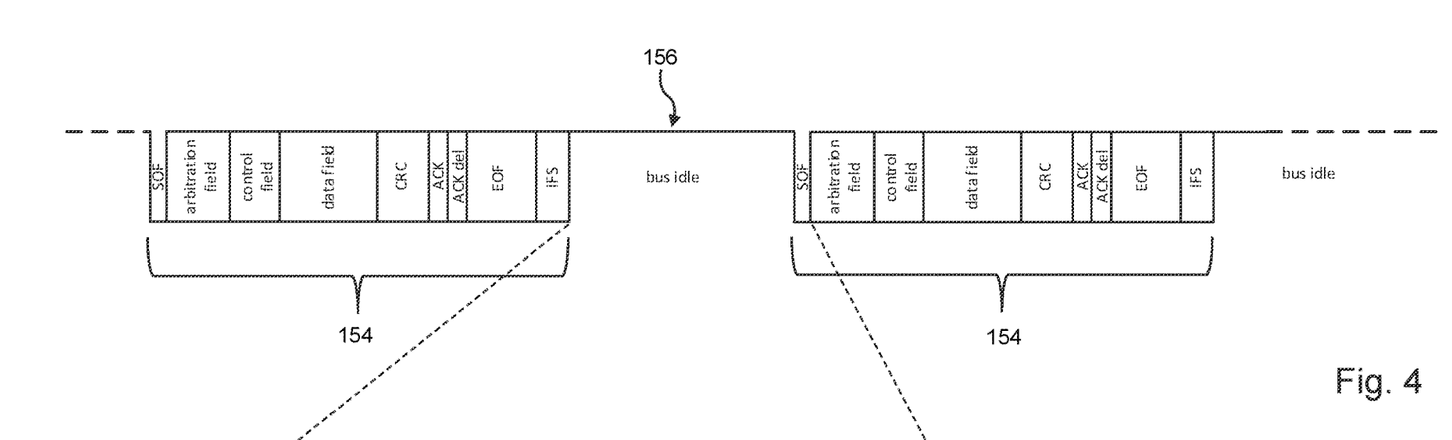
FIG. 4 shows a simplified BUS stream.

FIG. 4 shows the format of two frames designed according to ISO 11898-1 that may be used in CAN normal mode. The following fields are covered by a frame in CAN normal mode:

| | |
|---|---|
| SOF | Start of Frame (always dominant) |
| IDENTIFIER | Identifier Bits, defining the message content |
| RTR | Remote transmission request |
| IDE | ID Extension |
| r0 | Reserved Bit 0 (replaced by FDF in the CAN FD format) |
| FDF | FD Format (this is the bit distinguishing the frame formats) |
| BRS | Baud Rate Switch |
| ESI | Error State Indicator |
| DLC | Data Length Code |
| Data | Data Bytes |
| CRC | Cyclic Redundancy Check |
| CRC Del | CRC Delimiter (always recessive) |
| ACK | Acknowledge |
| ACK Del | Acknowledge Delimiter |
| EOF | End Of Frame |

There is also another version of the classic frame format, called "classic extended frame format (CEFF)", where the FDF bit is at the old r1 position, while the FDF bit is at the r0 position for CBFF. There is also a "FD extended frame format (FEFF)", where "extended" refers to a 29-bit identifier. It is worth noting that CAN protocols use the reserved bit (r0 or r1) (also commonly referred to as the FDF bit) within a CAN frame to identify a frame as a CAN FD mode frame. In particular, the FDF bit is a 1-bit field that indicates whether the frame is a CAN normal mode frame (ISO 11898-1) or a CAN FD mode frame (ISO/DIS 11898-1). If the FDF bit is dominant (e.g., low or "0"), the frame is a CAN normal mode frame, and if the FDF bit is recessive (e.g., high or "1"), the frame is a CAN FD mode frame.

A CAN frame 154 may represent a CAN message. Each CAN frame 154 is sent as a broadcast and the identifier is unique to the sending CAN node 102. Each CAN controller 108 may include an identifier filter that is "tuned" to specific identifiers to ensure that the host 110 receives relevant messages and is not bothered with irrelevant messages. Standard CAN frames 154 have an 11-bit IDENTIFIER field that includes an 11-bit identifier, and extended CAN frames have a 29-bit IDENTIFIER field that includes a 29-bit identifier.

A CAN frame 154 is initiated by a start bit, which is also referred to as the start of frame bit (SOF bit). The SOF bit is preferably a dominant bit. The nodes of a CAN network 100 may be synchronized with the falling edge of the SOF bit. The start bit (SOF) is followed by the bits of the identifier. The identifier identifies the logical address of node 102 and the priority of the message. The smaller the logical address of the message, the higher the priority of the message. When the identifier is transmitted, the MSB is transmitted first.

The end of a CAN frame 154 is the field with the end of frame (EOF) bits. The EOF bits are seven consecutive recessive bits. The EOF bits violate the stuffing coding. After the EOF three more recessive bits (IFS=Inter Frame Space) are inserted to ensure that the network nodes 102 have enough time to process the received message.

Several CAN frames 154 may be transmitted or received one after the other, Between two consecutive CAN frames 154 there may be a pause 156 in which no bits are transmitted or received.

Error-free transmission of CAN frames 154 is of great importance in many applications of CAN networks 100. In particular, high demands will be placed on the transmission of CAN frames 154 via a CAN network 100 in a vehicle in the future. It is therefore desirable to be able to determine whether a transmission of CAN frames 154 is possible without errors. At the same time, there is a need for a high transmission rate using a CAN network 100. It is expected that vehicles will drive autonomously in the future. Against this background, it is also to be expected that even higher expectations will be placed on the error-free transmission of CAN frames 154 than is currently foreseeable.

Previously, it was pointed out that FIG. 4 schematically shows CAN frames 154 that are transmitted one after the other. Between the CAN frames 154 there is a pause 156. In practical applications of networks, it often happens that there is a pause 156 between two CAN frames 154 transmitted one after the other. This pause 156 may be used to determine whether there is an error in the CAN transceiver 112 and/or an error in the CAN network 100. Therefore, the use of the pause 156 for error detection does not result in a reduction of the transmission rate of CAN frames 154 over the CAN network 100. Furthermore, the detection of an error is not limited to a start-up phase of the use of a CAN network 100. Rather, detection of an error may be performed repeatedly during operation of a CAN network 100, and whenever a pause 156 occurs that is suitable for doing so. Furthermore, to detect an error, it is not necessary to access a CAN frame 154 as such to perform error detection based on a possible manipulation or modification of the CAN frame 154. Rather, a TXD test pulse (TXD test pulse 138) may be transmitted within the pause 156 to determine whether an error of the CAN transceiver 112 or the CAN network 100 exists based on the transmitted TXD test pulse 138 and the recorded response of the test pulse. The CAN network 100 may also be referred to as the CAN BUS network 100.

Figure 6A:
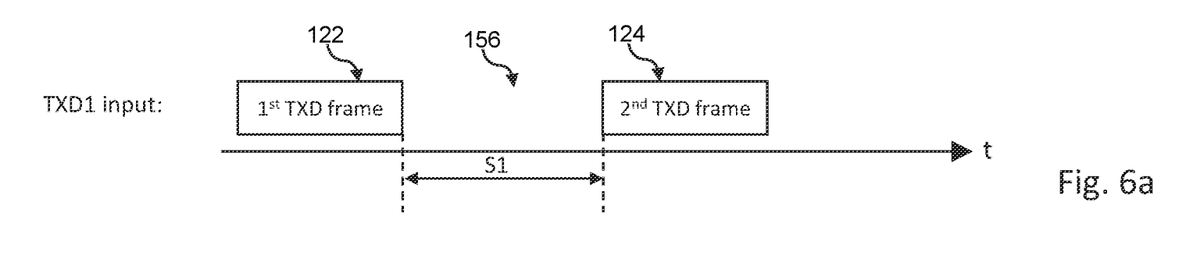
FIGS. 6a, 6b. 6c and 7a, 7b. 7c schematically show CAN frames.

As previously explained, FIG. 3 schematically illustrates one embodiment of the CAN module 118. The CAN module 118 includes a TXD input interface 120. The CAN module 118 may receive a TXD input signal from the CAN controller 108 by means of the TXD input interface 120. The TXD input signal represents at least one TXD frame 122, and one of the received TXD frames 122 is referred to as a first TXD frame 122. In the example as schematically shown in FIG. 6a, the first TXD frame 122 is followed by a second TXD frame 124. Between the first TXD frame 122 and the second TXD frame 124, there may be a pause 156 in which no bits are received from the TXD input interface 120. In particular, no bits are sent from the CAN controller 108 to the TXD input interface 120 of the CAN module 118 via the signal link 142 during the pause 156.

The TXD input interface 120 is preferably coupled to the processing logic 134 such that each TXD frame 122, 124 received by means of the TXD input interface 120 is transmitted to the processing logic 134. The processing logic 134 is configured to detect an EOF sequence consisting of 1 recessive ACK field delimiter, followed by 7 recessive EOF bits and 3 recessive IFS bits of the first TXD frame 122. It is to be assumed that the EOF sequence of the first TXD frame 122 forms the last field of the first TXD frame 122.

The pause 156 between the first TXD frame 122 and the second TXD frame 124 may be used to inject a TXD test pulse 138 between the first TXD frame 122 and the second TXD frame 124. The TXD test pulse 138 may be configured such that the TXD test pulse 138 is not confused with a bit from a CAN frame 154. For example, the duration Lil of the TXD test pulse 138 may be chosen to be short such that the TXD test pulse 138 does not satisfy a minimum duration of a bit for a CAN frame 154. Such a TXD test pulse 138 would therefore not negatively affect the transfer rate of a CAN network 100 nor the reliable transmission of CAN frames 154, 122, 124.

Therefore, the processing logic 134 of the CAN module 118 is configured to generate a TXD output signal based on the TXD input signal such that the TXD output signal represents the at least one TXD frame 122, 124 of the TXD input signal and additionally the TXD test pulse 138 in a first time interval D1 after the first TXD frame 122. The duration of the first time interval D1 may be greater than the duration U1 of the TXD test pulse 138, but it is possible that the duration D1 of the first time interval is exactly equal to the duration U1 of the TXD test pulse 138.

Figure 6B:
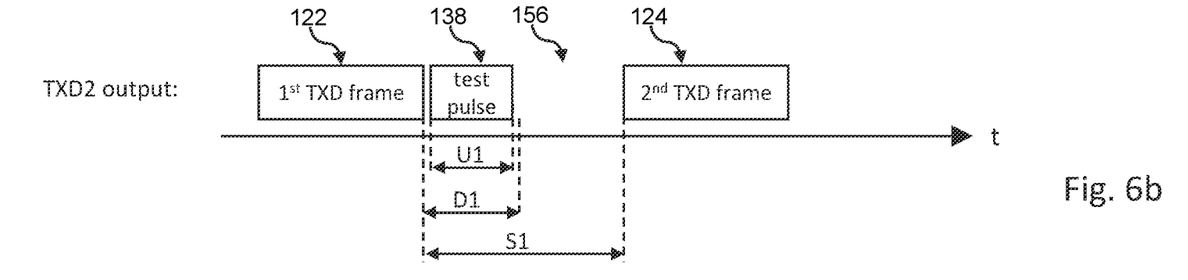

An example of the TXD output signal is shown schematically in FIG. 6b. The TXD output signal preferably comprises all TXD frames 122, 124 of the TXD input signal received by the CAN module 118 via the TXD input interface 120. One of the CAN frames of the TXD input signal is the first TXD frame 122, and there is a pause 156 between the first TXD frame 122 and the second TXD frame 124 with a duration referred to as the first time delay S1. The TXD test pulse 138 is located in the first time delay S1 of the first pause 156. Preferably, the duration U1 of the first TXD test pulse 138 is significantly shorter than the first time delay S1. Preferably, the TXD test pulse 138 directly follows the end of the first TXD frame 122.

The TXD output interface 126 of the CAN module 118 is configured to transmit the TXD output signal to the CAN transceiver 112. The CAN transceiver 112 is formed and configured to transmit the bits represented by the TXD output signal over the CAN BUS 104, in particular to other nodes 102. The CAN transceiver 112 is further formed and configured to monitor to the bits transmitted over the CAN BUS 104 and, by means of an associated receiver, generate an RXD signal at the TXD output interface 152 of the CAN transceiver 112 representing the monitored bits. Provided that there is no error in the CAN transceiver 112 and furthermore no error in the CAN network 104, the RXD signal may for example have the form as schematically shown in FIG. 6c.

The RXD signal is transmitted from the RXD output interface 152 of the CAN transceiver 112 to the RXD input interface 128 of the CAN module 118 via the signal line 150. The CAN module 118 receives the RXD signal as the RXD input signal at the RXD input interface 128. Insofar as the RXD input signal may reproduce and/or represent the TXD output signal, but the RXD input signal and the TXD output signal differ qualitatively by a time delay that arises, for example, from monitoring by means of the receiver of the CAN transceiver 112.

Figure 6C:
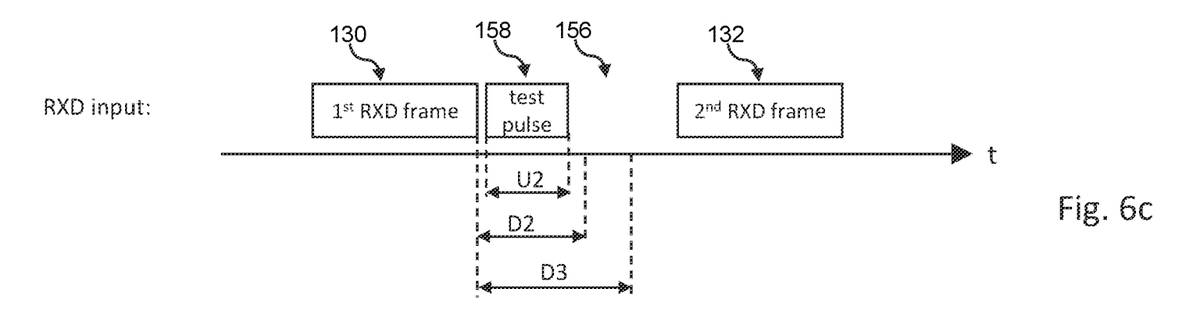

In the aforementioned example, the RXD input signal of FIG. 6c comprises a first RXD frame 130 and a second RXD frame 132. Between the first RXD frame 130 and the second RXD frame 132, there is a pause that is analogous to the pause 156. In the pause 156 of the RXD input signal, a test pulse 158 is arranged in said example. Since this test pulse 158 is represented by the RXD input signal, the test pulse 158 is referred to as the RXD test pulse 158. The first RXD frame 130 corresponds to the first TXD frame 122, so the same bits may be represented by the first RXD frame 130 and the first TXD frame 122. The second RXD frame 132 corresponds to the second TXD frame 124, so the same bits may be represented by the second RXD frame 132 and the second TXID frame 124. The RXD test pulse 158 is a result of the TXD test pulse 138. Thus, the RXD test pulse may correspond to the TXD test pulse 138, if there is no error. The RXD test pulse 158 may have a temporal duration U2 in the RXD input signal. Preferably, the RXD test pulse 158 is located in the second time interval D2 directly following the first RXD frame 130. The second time interval D2 of the RXD input signal may correspond to the first time interval D1 of the TXD output signal. Thus, the duration U2 of the RXD test pulse 158 may be less than the second time interval D2. The processing logic 134 may be configured to identify the RXD test pulse 158 in the second time interval D2. This may ensure robust identification of the RXD test pulse 158. Preferably, the duration U2 of the RXD test pulse 158 corresponds to the duration U1 of the TXD test pulse 138 if there is neither an error in the CAN transceiver 112 nor an error in CAN network 104. In this case, the RXD test pulse 158 may be detected as a test pulse in the RXD input signal corresponding to the TXD test pulse 138 of the TXD output signal. The processing logic 134 of the CAN module 118 may be configured to detect this.

Preferably, the processing logic 134 of the CAN module 118 is configured to detect whether the RXD input signal either represents the RXD test pulse 158 or whether the RXD input signal does not represent the RXD test pulse 158. In particular, the processing logic 134 may be configured to detect the RXD test pulse 158 in the RXD input signal as being positively represented if the RXD test pulse 158 corresponds to the TXD test pulse 138. In an example, the processing logic 134 may be configured to detect the duration U2 of the RXD test pulse 158 and compare the duration U2 of the RXD test pulse 158 to the duration U1 of the TX test pulse 138. The processing logic 134 may be configured to determine whether the RXD test pulse 158 corresponds to the TXD test pulse 138 based on the comparison result. If a positive match is found, this may be processed by the processing logic 134 such that the RXD test pulse 158 is considered to be positively detected in the RXD input signal.

The processing logic 134 of the CAN module 118 is further configured to determine an error of the CAN transceiver 112 or an error of the CAN network 104 based on a positive detection that the RXD test pulse 158 is not represented by the RXD input signal. Thus, if it is positively detected by the processing logic 134 that the R-XD test pulse 158 is not represented by the RXD input signal, the processing logic 134 will determine an error of the CAN transceiver 112 or an error of the CAN network 104. In particular, the processing logic 134 may be configured to determine an error that generalizes to an error of the CAN transceiver 112 or the CAN network 104. When the present disclosure refers to an error of the CAN transceiver 112 or an error of the CAN network 104, it may also generalize to mean an error in the CAN network between the TXD output interface 126 of the CAN module 118 and the RXD input interface 128 of the CAN module 118.

Based on the RXD input signal, if the processing logic 134 of the CAN module 118 determines that the RXD test pulse 158 is not represented by the RXD input signal following the first RXD frame 130, the processing logic 134 determines that an error exists in either the CAN transceiver 112 or the CAN network 104. However, if the RXD test pulse 158 is detected by the processing logic 134 in RXD input signal subsequent to the first RXD frame 130, then no error is present and no error is detected by the processing logic 134 in the CAN transceiver 112 or in the CAN network 104.

The test pulse, i.e., both the TXD test pulse 138 and the RXD test pulse 158, preferably have a time duration that is shorter than the regular duration for representing a bit according to the CAN standard. This can effectively prevent the test pulse from adversely affecting the data transmission in the CAN network 100. Thus, the bus load of the CAN network 100 is not affected by the use of the test pulse for error detection. The test pulse, i.e., both the TXD test pulse 138 and the RXD test pulse 158, is preferably represented by a short dominant pulse, which is preferably shorter than a regular bit according to the CAN standard.

FIG. 4 shows two frames 154 schematically. Each of these two frames 154 starts with the "Start of Frame" (SOF) bit. The SOF bit is formed by a dominant bit. Between the end of the left frame 154 and the SOF bit of the right frame 154 is the pause 156. The left frame 154 may be, for example, the first TXD frame 122 and the right frame 154 may be the second TXD frame 124.

Figure 5:
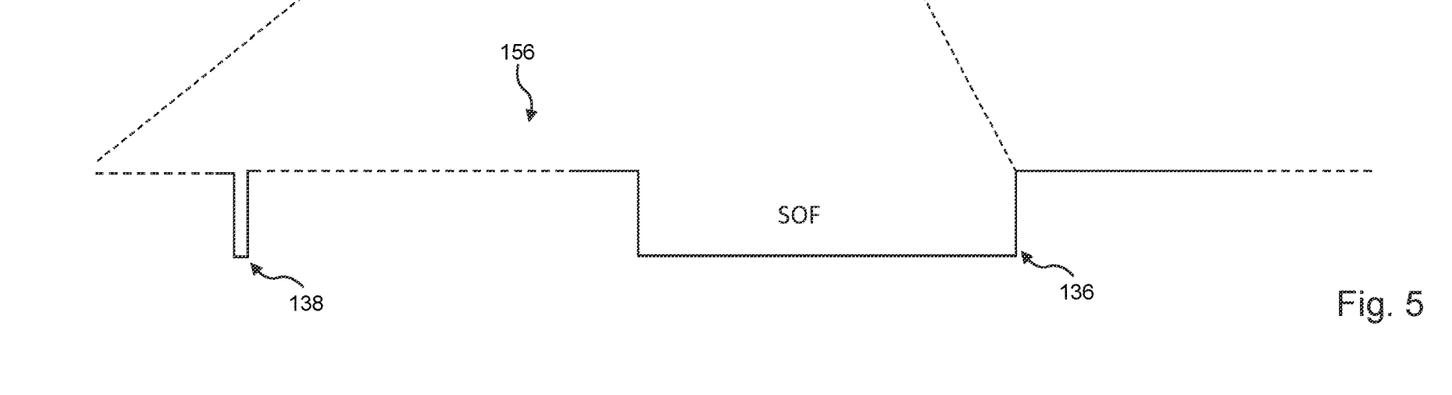
FIG. 5 shows a simplified part of the BUS stream.

In FIG. 5, a section of FIG. 4 is schematically shown, the section representing the pause 156 and the SOF field of the right frame 154, which may be the second TXD frame 124. The pause 156 is shown only schematically and in part by the dashed lines in FIG. 5. However, it may be seen that the duration of the test pulse 138 is significantly shorter than the duration of the SOF bit. The short duration of the test pulse 138 may prevent a node 102 of the CAN network 100 from inadvertently interpreting the test pulse 138 as an SOF bit of a frame 154. Furthermore, it is preferably provided that the test pulse 138 is formed as a dominant test pulse 138. Therefore, the test pulse 138 may be overridden by a dominant SOF bit when required. This may occur, for example, when another node 102 begins to send a new message over the CAN BUS 104 during the pause 156. In this case, the test pulse 138 is overwritten by a dominant SOF bit, for example. Therefore, the processing logic 134 of the CAN module 118 may be configured to detect whether a TXD test pulse 138 or an RXD test pulse 158 has been overwritten by a bit, in particular a dominant bit, of a frame sent by another node 102 over the CAN BUS 104. In this case, the processing logic 134 may still detect that the RXD input signal does not represent the RXD test pulse 158. However, the processing logic 134 may further be configured to not determine the error of the transceiver 112 or the error of the CAN BUS network 100 if the TXD test pulse 138 or the RXD test pulse 158 was overwritten by a dominant bit of another frame.

With reference to the illustrations of FIGS. 6a, 6b and 6c, it is rioted that the duration of frames 122, 124, 130, 132 and the duration of test pulses 138, 158 are shown only schematically and qualitatively.

In one example, the TXD input signal also represents the second TXD frame 124. The second TXD frame 124 follows the first TXD frame 122 with a time offset S1. The time offset S1 corresponds to the length of the pause 156. An example of the TXD input signal is shown schematically in FIG. 6a. The TXD output signal, as shown for example in FIG. 6b, is formed based on the TXD input signal and the TXD test pulse 138. The first time offset S1 between the first TXD frame 122 and the second TXD frame 124 in the TXD output signal therefore corresponds to the time offset S1 between the first TXD frame 122 and the second TXD frame 124 schematically shown in FIG. 6a.

Between the first frame 122 and the second frame 124 of the TXD input signal there may be a pause 156 which is at least the first time interval D1. The duration U1 of the TXD test pulse 138 is preferably less than or at most equal to the first time interval D1. The processing logic 134 may be configured to detect the duration of the time offset S1 in the input signal. Further, the processing logic 134 may be configured to determine whether said duration of the first time offset S1 is greater than the first time interval D1 for the TXD test pulse 138. The processing logic 134 may be configured to include the TXD test pulse 138 in the TXD output signal only if the duration of the time offset S1 is greater than the first time interval D1 for the TXD test pulse 138. This may prevent a collision of the TXD test pulse 138 to be inserted with the second TXD frame 124. A delay of the transmission of the TXD frames 122, 124 from the CAN controller 108 to the CAN transceiver 112 does not take place or only to a very small extent. This is because the transmission of the TXD frames 122, 124 is not affected by determining the duration of the time offset S1 or the pause 156. At most, the insertion of the TXD test pulse 138 may cause a very small time delay. However, the processing logic 134 may be configured to compensate for this time delay again if the duration of the pause 156 is longer than the first time interval D1 for the TXD test pulse 138, For example, the processing logic 134 may be configured to truncate the portion of the pause 156 that follows the insertion of the TXD test pulse 138 by the actual duration U1 of the TXD test pulse 138.

To prevent the TXD test pulse 138 from being detected as a start bit for a new frame 154, in particular as a start bit of the second TXD frame 124 from one of the nodes 102, it is provided that the duration L of the TXD test pulse 138 is shorter than the regular duration of a bit according to the CAN standard. The duration U1 of the TXD test pulse 138 may also be referred to as the test duration or test period. In one example, the duration U1 of the TXD test pulse 138 is between 100 ns and 4800 ns. The lower limit of 100 us may be determined by the features of the CAN transceiver 112. This is because the CAN transceiver 112 is controlled by the TXD test pulse 138, so that a corresponding differential voltage signal is generated in the CAN BUS 104. The upper limit may be determined by the regular duration of the bit according to the CAN standard. Thus, the upper limit is preferably at least 20%, at least 30% or at least 40% less than the regular duration of a SOF bit according to the CAN standard. It has been found to be particularly advantageous if the duration U1 of the TXD test pulse 138 is between 200 ns and 1200 ns, further preferably between 200 ns and 950 ns, and still further preferably between 200 ns and 600 ns. On the one hand, the duration U1 of the TXD test pulse 138 is thereby smaller than the duration of a bit according to the CAN standard. On the other hand, the duration U1 of the TXD test pulse 138 is large enough to robustly isolate itself from possible interference on the CAN BUS 104.

In one example, the processing logic 134 is configured to detect the first RXD frame 158. The first RXD frame 130 may correspond to the first TXD frame 122. This may mean that the first RXD frame 130 and the first TXD frame 122 have the same bits and/or represent the same message. For example, the processing logic 134 may be configured to recognize the first RXD frame 130 by an associated identifier. The identifier of the first RXD frame 130 may correspond to the identifier of the first TXD frame 122. The processing logic 134 may be configured to store the identifier of the first TXD bit frame 122. With the detection of the first RXD frame, the processing logic 134 may further determine the timing of the end of the first RXD frame 31.

In one example, the processing logic 134 is configured to detect the RXD test pulse 158 only in the second time interval D2. Preferably, the second time interval D2 directly follows the first RXD frame 130. The second time interval D2 may be greater than the duration U2 of the RXD test pulse 158. The second time interval D2 is preferably between 10% and 70% greater than the duration U1 of the TXD test pulse 138 or the duration 112 of the RXD test pulse 158, allowing robust detection of the RXD test pulse 158. This is because small temporal deviations or delays can occur even in error-free operation, so that the RXD test pulse 158 can also have a small temporal delay. In order to account for this small temporal delay even during error-free operation of the CAN transceiver 112 and/or the CAN network 100, it is preferably provided that the second time interval D2 is greater than the duration U2 of the RXD test pulse 158. By allowing the processing logic 134 to be configured to capture the RXD test pulse 158 exclusively in the second time interval, a noise robust detection of the RXD test pulse 158 may be achieved. Noise or other disturbances outside of the second time interval D2 have no negative effect on the detection of the RXD test pulse 158.

FIG. 3 schematically illustrates an example of the CAN transceiver 112. The CAN transceiver 112 includes a receiver that may be coupled to the CAN BUS 104 and the receiver is configured to generate an RXD signal at the TXD output interface 152 of the CAN transceiver 112 based on differential voltage signals on the CAN BUS 104. The RXD signal is routed to the RXD input interface 128 of the CAN module 118 via the signal line 150. The CAN transceiver 112 further comprises a transmitter configured to generate a differential voltage signal on the CAN BUS 104 based on a TXD signal that the CAN transceiver 112 can receive via the TXD input interface 148. In particular, the transmitter and the receiver of the CAN transceiver 112 may contribute to a time delay between the TXD output signal and the RXD input signal in the CAN module 118.

Figure 7A:
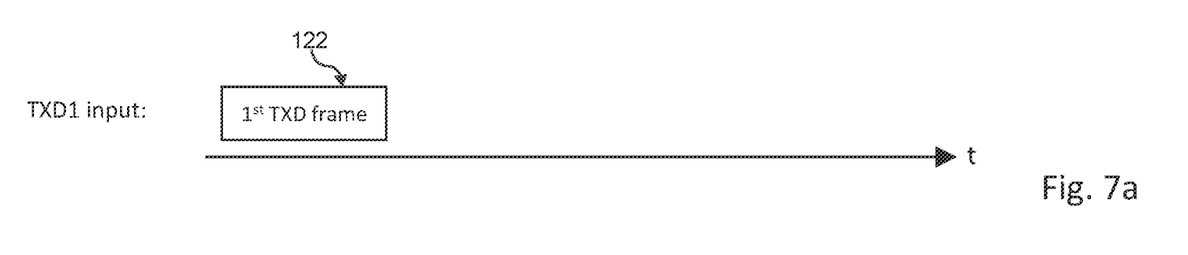
Figure 7B:
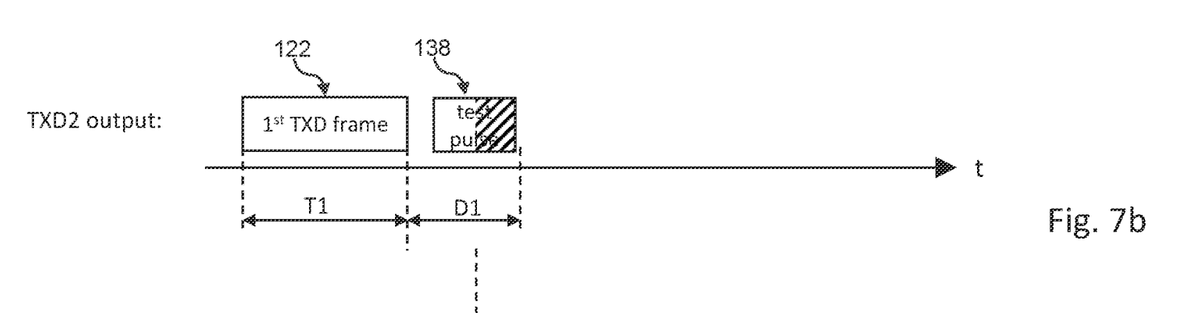

As can be seen schematically from FIG. 1, multiple nodes 102 may communicate with each other via the CAN BUS 104. Therefore, it may be the case that the CAN module 118 has begun to send a TXD test pulse 138 via the TXD output signal to the CAN transceiver 112 of one of the nodes 102 while another node 102 begins to send a message via the CAN BUS 104, FIG. 7a schematically illustrates an example of a TXD input signal that the CAN module 118 may receive in the case previously explained. The CAN module 118 may generate the TXD output signal based on the TXD input signal and an additional added TXD test pulse 138. FIG. 7b schematically illustrates an example of the TXD output signal. While the TXD test pulse 138 is being generated, the processing logic 134 may analyze the RXD input signal received via the TXD input interface 128. If the processing logic 134 determines that another RXD frame is received via the RXD input signal in a third temporal interval D3 that was sent by another node 102 (that does not include the CAN module 118), the CAN module 118 may interrupt the generation of the TXD test pulse 138. Interrupting the generation of the TXD test pulse 138 may prevent a possible conflict with the RXD frame or may end a conflict that has already begun.

In one example, the processing logic 134 is configured to detect whether the RXD input signal represents a start bit of a further RXD frame 160 in the third time interval D3 after the first RXD frame 130. In this regard, the further RXD frame 160 is not caused by any of the frames 122, 124 of the TXD input signal that the CAN module 118 may receive via the TXD input interface 120. The processing logic 134 may further be configured to generate the TXD output signal representing both the at least one TXD frame 122, 124 and the TXD test pulse 138 only if and/or only until the processing logic 134 does not detect a start bit of the other RXD frame 160. In this context, the other RXD frame 160 is preferably understood to be an RXD frame that is not caused by the at least one TXD frame 122 of the TXD output signal. Thus, if the processing logic 134 detects in the RXD input signal, for example, another RXD frame 160 caused by a remote node 102, the processing logic 134 may abort the generation of the TXD test pulse 138 or prevent the generation even before it starts. The processing logic 134 may therefore help to ensure that a transmission of messages over the CAN BUS 104 is not adversely affected by the TXD test pulse 138.

Figure 7C:
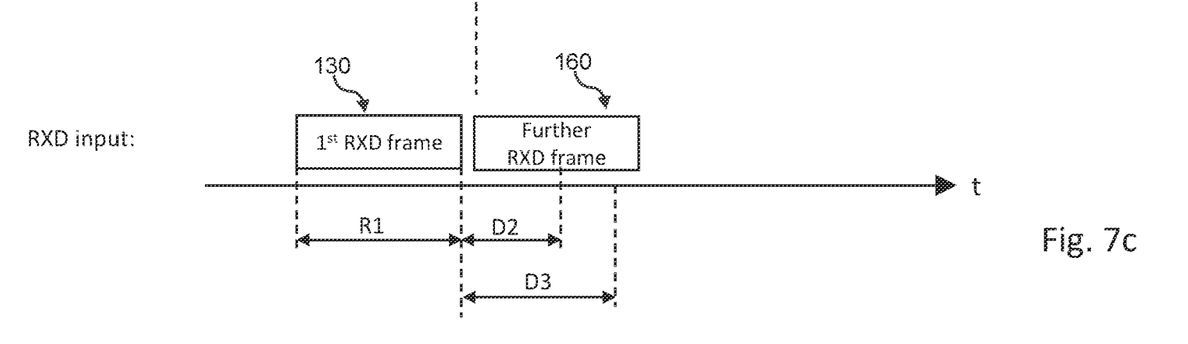

The third time interval D3 may be longer than the second time interval D2. Based on the schematic representation in FIGS. 7b and 7c, it is not obvious at first glance that the start bit of the further RXD frame 160 may have a lonter duration than the second time interval D2. Due to the very short duration U1 of the TXD test pulse 138, the duration D1 of the first interval and, in an analogous manner, the duration D2 of the second interval may be kept similarly short. The duration of a bit according to the CAN standard and thus also the duration of the start frame or the SOF bit of the further RXD frame 160 can therefore be longer than the second time interval D2. With this in mind, it is advantageous if the processing logic 134 is configured to monitor that RXD input signal over the third time interval D3 to determine, if necessary, whether reception of the further frame 160 over the RXD input signal has started in the third time interval D3.

In one example, the processing logic 134 is configured such that the processing logic 134 forwards the TXD input signal as a TXD output signal, particularly unchanged, when the processing logic 134 detects the start bit of the further frame 160 in the third time interval D3. Provided that the processing logic 134 has not yet started generating the TXD test pulse 138, the processing logic 134 may forward the TXD input signal unchanged as a TXD output signal.

In an example, the processing logic 134 includes a pulse generator 162. The pulse generator 162 is shown schematically in FIG. 3. The processing logic 134 may further comprise a processing unit 164 coupled to the pulse generator 162. The processing logic 134 may include a unit 166 configured to detect a pause 156 in the RXD input signal. This unit 166 may also be coupled to the processor unit 164. In addition, the processing logic 134 may include another unit 168 configured to generate the TXD output signal from the TXD input signal and the TXD test pulse 138. This unit 168 may be coupled to both the pulse generator 162 and the TXD input interface 120.

The processing logic 134 is configured to generate the TXD output signal such that the TXD output signal further represents the TXD test pulse 138 in addition to the at least one TXD frame 122 of the TXD input signal. The duration U1 of the TXD test pulse 138 is therefore known to the processing logic 134.

In one example, the processing logic 134 is further configured to detect the duration U2 of the RXD test pulse 158 represented by the RXD input signal Unless there is a relevant time difference between the duration U2 of the RXD test pulse and the duration U1 of the TXD test pulse 138, it may be assumed that there is no error in the CAN transceiver 112 and also no error in the CAN network 100.

In one example, the processing logic 134 is configured to determine the error of the CAN transceiver 112 and/or the error of the CAN network 100 to be present only if, or at least also if, a time difference between the duration U1 of the TXD test pulse 138 represented by the TXD output signal and the duration U2 of the RXD test pulse 158 represented by the RXD input signal is greater than a predetermined dead time. The processing logic 134 may be configured to determine the time difference. The predetermined dead time may be stored by the processing logic 134. For example, the predetermined dead time may be between 1% and 20% of the duration U1 of the TXD test pulse 138. Taking the dead time into account causes a certain tolerance for the comparison of the duration of the two test pulses, so that the detection of the error of the transceiver 112 or the CAN network 100 is particularly robust against irrelevant variations.

If the CAN module 118 detects an error of the CAN transceiver 112 or an error of the CAN network 100, it has been found to be advantageous if the information about the error is passed on to higher-level units.

In one example, the CAN module 118 includes a communication interface 140. In FIG. 3, the communication interface 140 is shown schematically. The communication interface 140 may be coupled to the CAN controller 108 via another signal connection 170. The CAN controller 108 may have further signal connections (not shown) to higher-level units.

In one example, the processing logic 134 of the CAN module 118 is configured such that the processing logic 134 generates an error signal representing the error in response to a positive determination of the error, that is, either the error of the transceiver 112 or the error of the CAN network 100. The processing logic 134 may further be configured to control the communication interface 140 such that the error signal is transmitted. For example, the processing logic 134 may control the communication unit 140 such that the error signal is transmitted from the communication interface 140 to the CAN controller 108. The CAN controller 108 may forward the information about the error to a higher-level unit. However, it is also possible for the CAN controller 108 to initiate follow-up actions from the information about the error.

In another example, the communication interface 140 may be configured to receive an instruction signal representing an instruction to initiate the TXD output signal representing the TXD test pulse 138. Preferably, the communication interface 140 is coupled to the processing logic 134 such that the instruction signal is directed to the processing logic 134. When a corresponding instruction signal is received by the processing logic 134, the processing logic 134 may generate a TXD output signal based on the TXD input signal in response to the received instruction signal, the TXD output signal further representing the TXD test pulse 138. Thus, via the communication interface 140 and the instruction signal, the CAN module 118 may be controlled by the CAN controller 108 to test whether an error exists in the CAN transceiver 112 or the CAN network 100.

In FIG. 3, the CAN module 118 is shown physically separate from the CAN transceiver 112. The CAN module 118 can thus be a physically separate unit from the CAN transceiver 112, which in practical use may be coupled to the CAN transceiver 112 via signal connections 146, 150.

Figure 8:
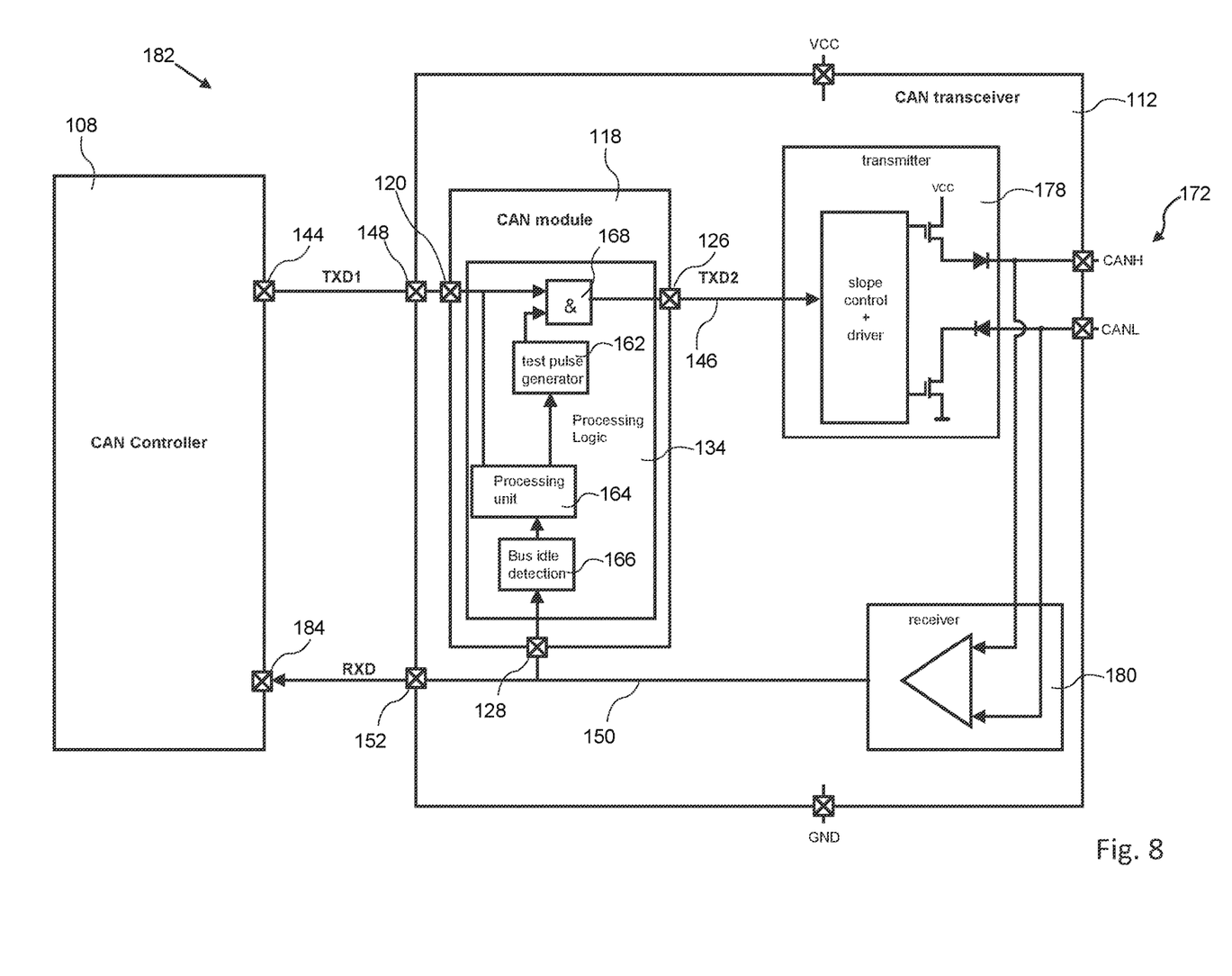
FIG. 8 shows another simplified block diagram including a CAN controller, a CAN module and a CAN transceiver.

However, the CAN module 118 of FIG. 3 is only one of embodiments of the CAN module 118. In fact, the CAN module 118 and the CAN transceiver 112 may be attached to each other and/or may be formed at least partly integral Another possible embodiment of the CAN module 118 is schematically shown in FIG. 8. As can be seen schematically from FIG. 8, the CAN module 118 may form a part, in particular an integral part, of the CAN transceiver 112. For the design of the CAN module 118 as an integral part of the CAN transceiver 112, reference is made to the preceding explanations, preferred features, technical effects and advantages in an analogous manner as they have been reproduced previously for the CAN module 118 of FIG. 3.

In an example, the CAN transceiver 112 comprises a CAN network interface 172, a RXD output interface 152, a TXD input interface 148, a transmitter 178, and a receiver 180. As indicated above, the CAN transceiver 112 may also comprises the CAN module 118 as an integrated unit of the CAN transceiver 112. The TXD input interface 120 of the CAN module 118 may form the TXD input interface 148 of the CAN transceiver 112. Alternatively, the TXD input interface 120 of the CAN module 118 may be coupled to the TXD input interface 148 of the CAN transceiver 112. The transmitter 178 of the CAN transceiver 112 may be coupled between the TXD output interface 126 of the CAN module 118. Further, the CAN transmitter 178 may be coupled to the CAN network interface 172. The CAN transmitter 178 may be configured to generate a differential voltage signal between the nodes CANH and CANL, such that the differential voltage signal represents the frames which the transmitter 178 may receive via an TXD output signal of the CAN module 118. Further, the receiver 180 of the transceiver 112 may be coupled between the CAN network interface 172 and both the RXD output interface 152 of the transceiver 112 and the RXD input interface 128 of the CAN module 118.

According to an embodiment of the present disclosure, a CAN system 182 is provided. FIG. 8 schematically shows an example of the CAN system 182. The CAN system 172 comprises a CAN controller 108 and a CAN transceiver 112. The CAN transceiver 112 may be one the embodiments and/or examples explained above.

In an example, the CAN controller 108 may comprise a TXD output interface 144 and an RXD input interface 184. The TXD output interface 144 of the CAN controller 108 being coupled to the TXD input interface 148 of the CAN transceiver 148 and/or the TXD input interface 120 of the CAN module 118. The RXD input interface 184 of the CAN controller 108 being coupled to the RXD output interface 152 of the CAN transceiver 112.

In another embodiment, the CAN system 172 may comprise a CAN controller 108, a CAN transceiver 112 and a CAN module 118. The CAN module 118 may be arranged between the CAN controller 108 and the CAN transceiver 112.

In an example, the CAN controller 108 comprising the TXD output interface 144 and the RXD input interface 184, wherein the TXD output interface 144 of the CAN controller 108 being coupled to the TXD input interface 120 of the CAN module 118. Further, the RXD input interface 184 of the CAN controller 108 may be coupled to a RXD output interface 152 of the CAN transceiver 112. The CAN transceiver 112 preferably comprising the CAN network interface 172, the TXD input interface 148, the RXD output interface 152, the transmitter 178, and the receiver 180. The TXD input interface 148 of the CAN transceiver 112 may be coupled to the TXD output interface 126 of the CAN module 118. The transmitter is preferably coupled between the TXD input interface 148 of the CAN transceiver 112 and the CAN network interface 172, wherein the receiver 180 is preferably coupled between the CAN network interface 172 and the RXD output interface 152 of the transceiver 112.

The CAN controller 108 may comprise a communication interface 186, wherein the communication interface 186 of the CAN controller 108 may be directly or indirectly coupled to the communication interface 140 of the CAN module 118. The CAN controller 108 may be configured to generate the instruction signal. The instruction signal may represent an instruction for the CAN module to perform an error test. The CAN controller 108 may be configured to control the communication interface 168 of the CAN controller 108 to transmit the instruction signal to the CAN module 118.

Figure 9:
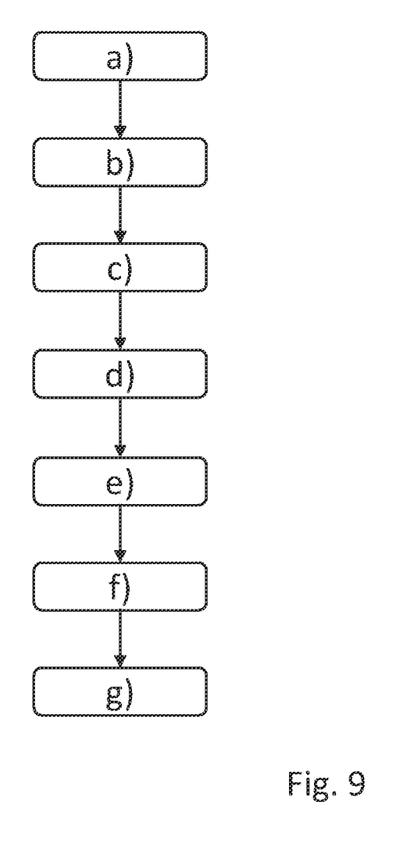
FIG. 9 shows a simplified flow chart of a method.

According to another embodiment of the present disclosure, a method for detecting an error is provided. FIG. 9 schematically shows a flowchart of an example of the method.

In an example, the method is for the Controller Area Network, CAN, module 118. The CAN module 118 may comprise the transmit data, TXD, input interface 120, the TXD output interface 126, the receive data, RXD, input interface 128, and the processing logic 134. The method may comprise the following steps:

h) receiving at the TXD input interface 120 of the CAN module 118 a TXD input signal from a CAN controller 108, the input signal representing at least one TXD frame 122, 124 of bits, i) the processing logic 134 detecting an end of frame sequence of a first TXD frame 122 of the at least one TXD frame 122, 124, j) the processing logic 134 generating an TXD output signal based on the TXD input signal, such that the TXD output signal represents the at least one TXD frame 122 of the input signal and in addition a test pulse 138 in a first time interval D1 following the first TXD frame 122, k) transmitting at the TXD output interface 126 the TXD output signal to a CAN transceiver 112, l) receiving in response to step d) at the RXD input interface 128 a RXD input signal from the CAN transceiver 112, the RXD input signal representing at least one RXD frame 130 of bits, m) the processing logic 134 detecting whether the RXD input signal either represents the test pulse 158 or does not represent the test pulse 158, and n) the processing logic 134 determining an error of the CAN transceiver 112 or a CAN BUS network 104 connected to the CAN transceiver 112 in response to a positive detection in step f) that the test pulse 158 is not represented by the RXD input signal.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

Unless stated otherwise, terms such as "first", "second", etc. are used to arbitrarily distinguish between the elements such terms describe. Thus, these terms are not necessarily intended to indicate temporal or other prioritization of such elements.

The invention claimed is:

1. A Controller Area Network, CAN, module, comprising:
a transmit data, TXD, input interface for receiving a TXD input signal from a CAN controller, the input signal representing at least one TXD frame of bits,
a TXD output interface for transmitting a TXD output signal to a CAN transceiver,
a receive data, RXD, input interface for receiving a RXD input signal from the CAN transceiver, the RXD input signal representing at least one RXD frame of bits, and
a processing logic configured to detect an end of frame, EOF, sequence of a first TXD frame of the at least one TXD frame,
wherein the processing logic is configured to generate the TXD output signal based on the TXD input signal, such that the TXD output signal represents the at least one TXD frame of the input signal and in addition a test pulse in a first time interval following the first TXD frame, wherein the processing logic is configured to detect whether the RXD input signal either represents the test pulse or does not represent the test pulse, wherein the processing logic is configured to determine an error of the CAN transceiver or a CAN BUS network connected to the CAN transceiver in response to a positive detection that the test pulse is not represented by the RXD input signal;

wherein the processing logic is configured to detect a first RXD frame corresponding to the first TXD frame, wherein the processing logic is configured to detect the test pulse only in a second time interval following the first RXD frame, the second time interval corresponding to the first time interval, wherein the processing logic is configured to detect whether the RXD input signal represents a start of frame, SOF, bit of another second RXD frame in a third time interval following the first RXD frame, and wherein the processing logic is configured to generate the TXD output signal representing the at least one TXD frame and the test pulse only if the processing logic does not detect the SOF of the second RXD frame in the third time interval.

2. The CAN module of claim 1, wherein the TXD input signal represents a second TXD frame following the first TXD frame at a time offset, the time offset between the first TXD frame and the second TXD frame being at least the first time interval.

3. The CAN module of claim 1, wherein the third time interval is longer than the second time interval.

4. The CAN module of claim 1, wherein the processing logic is configured to forward the TXD input signal as the TXD output signal, if the processing logic detects the SOF of the second RXD frame in the third time interval.

5. The CAN module of claim 1, wherein the processing logic comprises a pulse generator to generate the test pulse.

6. The CAN module of claim 1, wherein a test period of the test pulse is between 50 ns and 950 ns, preferably between 90 ns and 600 ns.

7. The CAN module of claim 1, wherein the processing logic is configured to detect the duration of the test pulse represented by the RXD input signal, and wherein the processing logic is configured to determine the error of the transceiver or a CAN BUS network connected to the transceiver also or only if a time difference between the period of the test pulse represented by the TXD output signal and the duration of the test pulse represented by the RXD input signal is more than a predetermined tolerance time.

8. The CAN module of claim 1, wherein the CAN module comprising a communication interface, wherein processing logic is configured to generate a error signal in response to a positive determination of the error, the error signal representing the error, wherein the processing logic is configured to control the communication interface to transmit the error signal.

9. The CAN module of claim 1, wherein the communication interface is configured to receive an instruction signal representing the instruction to initiate the generation of the TXD output signal representing the test pulse.

10. A CAN system, comprising: a CAN controller, the CAN module of claim 1 and a CAN transceiver, wherein the CAN controller comprises a TXD output interface and an RXD input interface, wherein the TXD output interface of the CAN controller is coupled to the TXD input interface of the CAN module, wherein the RXD input interface of the CAN controller is coupled to a RXD output interface of the CAN transceiver, wherein the CAN transceiver comprises a CAN network interface, a TXD input interface, the RXD output interface, a transmitter, and a receiver, wherein the TXD input interface of the CAN transceiver is coupled to the TXD output interface of the CAN module, wherein the transmitter is coupled between the TXD input interface of the CAN transceiver and the CAN network interface, wherein the receiver is coupled between the CAN network interface and the RXD output interface of the transceiver.

11. A method for a Controller Area Network, CAN, module, wherein the CAN module comprising a transmit data, TXD, input interface, a TXD output interface, a receive data, RXD, input interface, and a processing logic, wherein the method comprising the following steps:

receiving at the TXD input interface of the CAN module a TXD input signal from a CAN controller, the input signal representing at least one TXD frame of bits, the processing logic detecting an end of frame, EOF, sequence of a first TXD frame of the at least one TXD frame, the processing logic generating an TXD output signal based on the TXD input signal, such that the TXD output signal represents the at least one TXD frame of the input signal and in addition a test pulse in a first time interval following the first TXD frame, transmitting at the TXD output interface the TXD output signal to a CAN transceiver, receiving at the RXD interface, in response to transmitting the TXD output signal, a RXD input signal from the CAN transceiver, the RXD input signal representing at least one RXD frame of bits, the processing logic detecting whether the RXD input signal either represents the test pulse or does not represent the test pulse, the processing logic determining an error of the CAN transceiver or a CAN BUS network connected to the CAN transceiver in response to a positive detection that the test pulse is not represented by the RXD input signal, detecting a first RXD frame corresponding to the first TXD frame by the processing logic, wherein the method also comprises the step of detecting the test pulse by the processing logic only in a second time interval following the first RXD frame, the second time interval corresponding to the first time interval, and detecting by the processing logic whether the RXD input signal represents a start of frame, SOF, bit of another second RXD frame in a third time interval following the first RXD frame, wherein the TXD output signal represents the at least one TXD frame and also the test pulse only if processing logic does not detect the SOF of the second RXD frame in the third time interval.

12. The method of claim 11, wherein the TXD input signal represents a second TXD frame following the first TXD frame at a time offset, the time offset between the first TXD frame and the second TXD frame being at least the first time interval.

13. The method of claim 11, wherein the third time interval is longer than the second time interval.

* * * * *